United States Patent
Adams et al.

(10) Patent No.: US 7,909,265 B2
(45) Date of Patent: Mar. 22, 2011

(54) HERBICIDE AND PESTICIDE CARRIER

(76) Inventors: Randy L Adams, Muskegon, MI (US); Carolyn D. Adams, Muskegon, MI (US)

(*) Notice: Subject to any disclaimer, the term of this patent is extended or adjusted under 35 U.S.C. 154(b) by 679 days.

(21) Appl. No.: 11/892,376

(22) Filed: Aug. 22, 2007

(65) Prior Publication Data
US 2008/0048049 A1 Feb. 28, 2008

Related U.S. Application Data

(60) Provisional application No. 60/839,695, filed on Aug. 24, 2006.

(51) Int. Cl.
*A01G 25/09* (2006.01)
(52) U.S. Cl. ......... 239/146; 239/147; 239/172; 222/626
(58) Field of Classification Search .................. 239/146, 239/147, 149, 172; 222/135, 626
See application file for complete search history.

(56) References Cited

U.S. PATENT DOCUMENTS

| | | | | |
|---|---|---|---|---|
| 2,243,597 A * | 5/1941 | Elliott | ............................ | 222/609 |
| 2,772,921 A * | 12/1956 | Nance | ........................... | 239/172 |
| 3,052,077 A * | 9/1962 | McGlothlin et al. | ........... | 56/11.6 |
| 3,106,344 A * | 10/1963 | Baird, Jr. et al. | ............... | 239/130 |
| 3,977,602 A * | 8/1976 | Kirch | .............................. | 239/74 |
| 4,269,356 A * | 5/1981 | Rose | ............................. | 239/167 |
| 4,967,960 A * | 11/1990 | Futrell | .......................... | 239/148 |
| 5,269,030 A * | 12/1993 | Pahno et al. | ....................... | 5/604 |
| 5,286,045 A | 2/1994 | Cyphers et al. | | |
| 5,293,887 A * | 3/1994 | Thibodeaux | .................... | 134/24 |
| 5,385,106 A | 1/1995 | Langshaw | | |
| 5,405,086 A * | 4/1995 | Kranzle | ......................... | 239/172 |
| 6,036,123 A * | 3/2000 | West | .............................. | 239/750 |
| 6,279,838 B1 * | 8/2001 | Sivells et al. | .................. | 239/146 |
| 6,698,774 B2 * | 3/2004 | Duncan | ........................... | 280/63 |
| 6,805,304 B1 * | 10/2004 | Nokes et al. | ................... | 239/146 |
| 2006/0196967 A1 * | 9/2006 | Monty | ............................ | 239/73 |
| 2007/0084946 A1 * | 4/2007 | Neville | ......................... | 239/172 |

* cited by examiner

*Primary Examiner* — Len Tran
*Assistant Examiner* — Trevor E McGraw
(74) *Attorney, Agent, or Firm* — Richard C. Litman

(57) ABSTRACT

A wheeled herbicide and/or pesticide carrier incorporates a non-motorized, three wheeled cart including a frame defining a basket for receiving tanks containing a fluid solution. An air compressor and battery are also supported on the cart. A nozzle communicates with the tanks for dispensing the solution. A control panel is mounted on the cart's handle to permit a user to select which tank is to be utilized and the rate for spraying. A second embodiment of the invention is designed to support four tanks thereon.

15 Claims, 14 Drawing Sheets

HERBICIDE AND PESTICIDE CARRIER

CROSS-REFERENCE TO RELATED APPLICATION

This application claims the benefit of U.S. Provisional Patent Application Ser. No. 60/839,695, filed Aug. 24, 2006.

BACKGROUND OF THE INVENTION

1. Field of the Invention

The present invention generally relates to dispensing apparatus. More specifically, the present invention is drawn to a non-motorized cart for dispensing herbicide and/or pesticide.

2. Description of the Related Art

Maintaining lawn and garden areas often require spraying solutions of herbicide and/or pesticides on all or portions of the area. Conventionally, this task requires carrying a heavy container to the area and manually pumping the solution from the container. When the container is empty, another container must be retrieved and carried to the area being treated. Even for those who enjoy "yard work", such a task can be arduous and energy draining. The art would certainly welcome an apparatus that would alleviate the heavy lifting and the energy-draining manual pumping, while also providing an ample amount of herbicide and/or pesticide solution to treat a relatively large area. Thus a non-motorized, wheeled cart solving the aforementioned problems is desired.

The related art is replete with carts designed to carry dispensing apparatus. Pertinent samples of such related art are cited and identified in the accompanying IDS. However, none of the cited and identified related art, taken either singly or in combination, is seen to disclose a wheeled herbicide carrier as will subsequently be described and claimed in the instant invention.

SUMMARY OF THE INVENTION

The wheeled carrier of the present invention comprises a non-motorized, three wheeled cart including a frame defining a basket for receiving at least one tank containing herbicide and/or pesticide solution. In the preferred embodiment, an air compressor and battery are also supported on the cart. A nozzle communicates with the tank for dispensing solution therefrom. A control panel is mounted on the cart's handle to permit a user to select which tank is to be utilized and the rate for spraying.

Accordingly, the invention presents a herbicide and pesticide cart that is rugged, efficient and easy to use. It should be recognized that invention can be utilized to spray almost any liquid solution. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
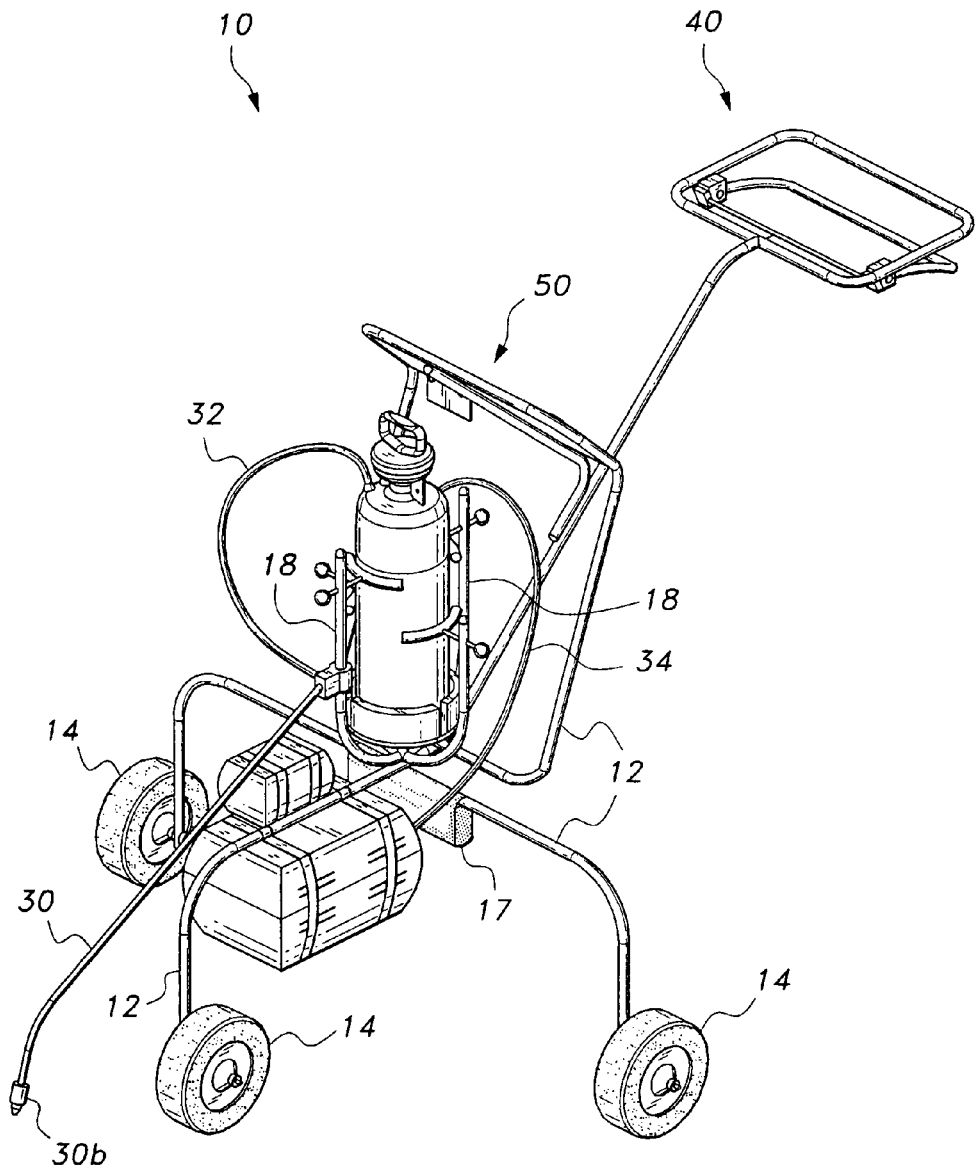
FIG. 1 is a perspective view of a first embodiment of a wheeled carrier according to the present invention.
Figure 2:
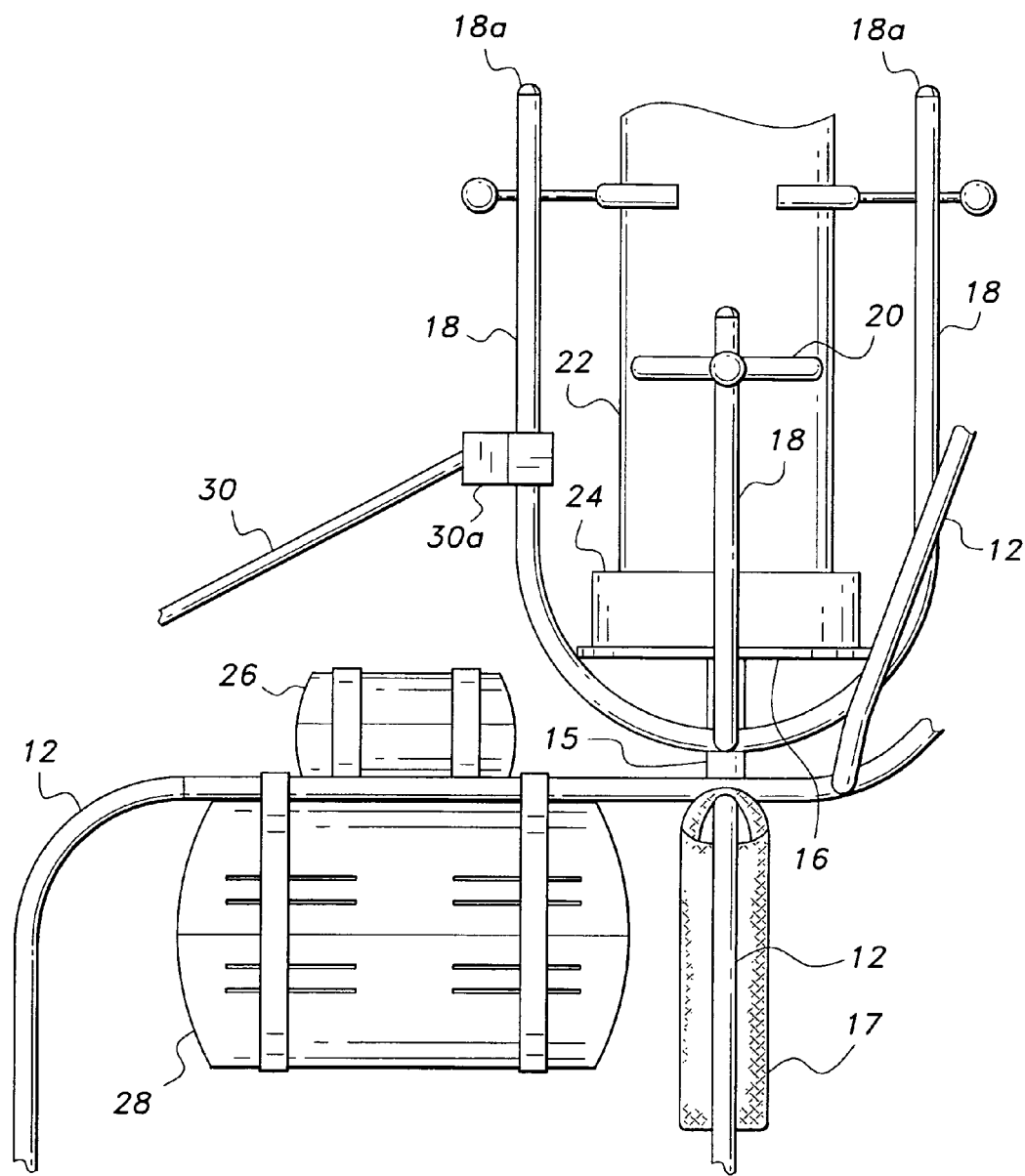
FIG. 2 is a partial side view of a first embodiment of a wheeled carrier according to the present invention.

Attention is first directed to FIGS. 1 and 2 wherein a first embodiment of the present invention is generally indicated at 10. Herbicide and/or pesticide carrier 10 comprises a tubular frame constructed from tubular stock members 12. The frame has three legs, wherein a first leg defines a center member having a first end and a second end, a second leg and a third leg being located symmetrically about the center member and having terminal ends. The tubular frame 12 is mounted on three wheels 14 (two rear wheels mounted on the terminal ends of frame member 12 and one front wheel mounted at the first end of the center member). To insure stability and easy movement, the rear wheels are slightly larger than the front wheels and the tubular support for the rear wheels are mounted behind the solution tanks. A basket, comprising a base plate 16, an array of tubes 18 and adjustable clamp members 20, is mounted on the frame in any convenient manner. The basket functions to support first and second solution tanks 22 and 24 therein. Clamp members 20 are operative to stabilize the tanks in the basket. Spacers 15 are provided, where needed, to further add stability to the structure. Plugs 18a are provided to close the open ends of tubes 18.

An air compressor 28 and a battery 26 are supported on the frame beneath the basket. A tubular arm 30 has one end member 30a attached to one of the tubes 18 that forms the basket. Member 30a can be vertically and rotationally positioned on tube 18. A second end of tube 30 terminates in a spray nozzle 30b. A flexible tube 32 connects the herbicide solution tanks to the end member 30a of arm 30. A second flexible tube 34 connects air compressor 26 with the fuel tanks. A handle 40 and control panel 50, whose functions will be explained below, are also supported on the frame.

Figure 3:
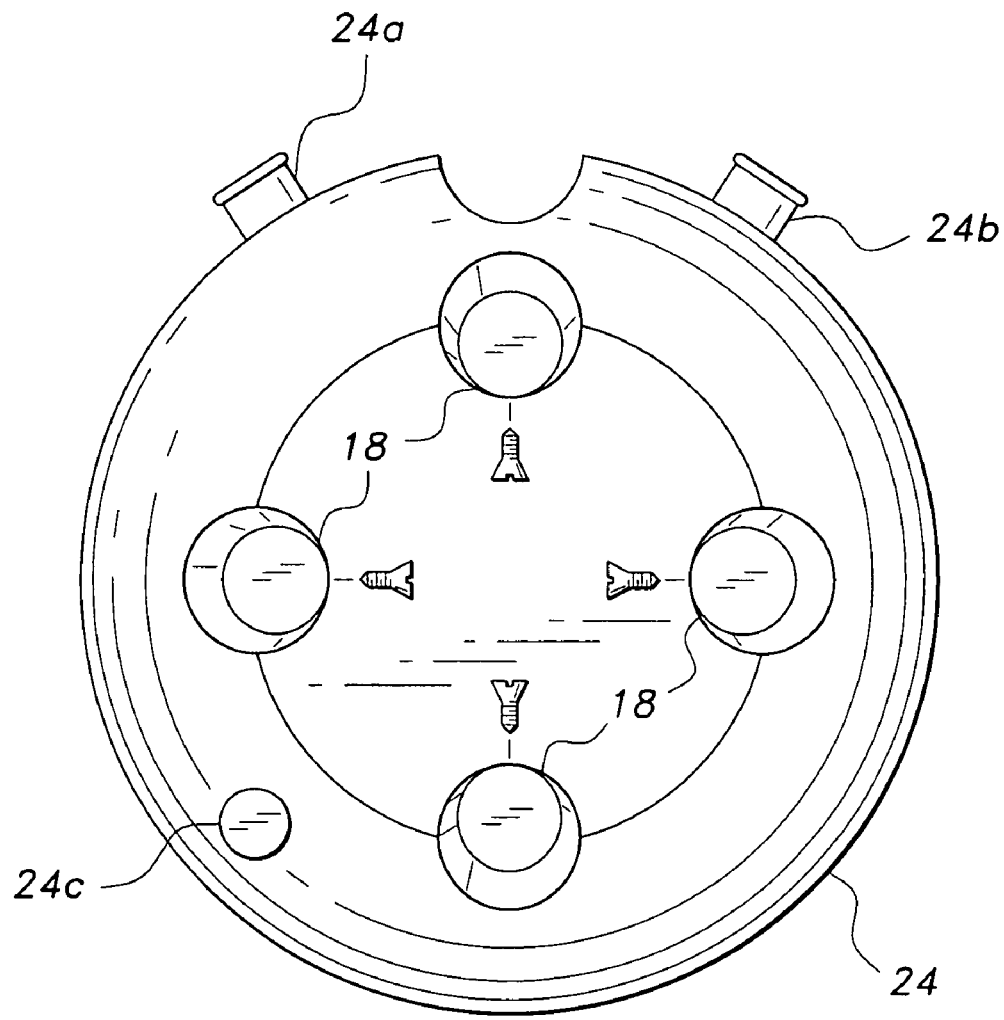
FIG. 3 is a top view of the second fuel tank of a wheeled carrier according to the present invention.

Attention is now directed to FIG. 3 wherein the structure of second tank 24 is more clearly illustrated. Tank 24 is configured as a hollow doughnut and is adapted to encircle first tank 22. Tank 24 is provided with respective inlet and outlet conduits 24a and 24b. A cap 24c is disposed to close a fill opening in the tank. Niches are spaced around the inner circumference of tank 24 to receive basket tubes 18 therein whereby the tank can be fastened to the tubes for greater stability. A pouch 17 is provided to house the nozzle (not shown) for tank 24.

Figure 4:
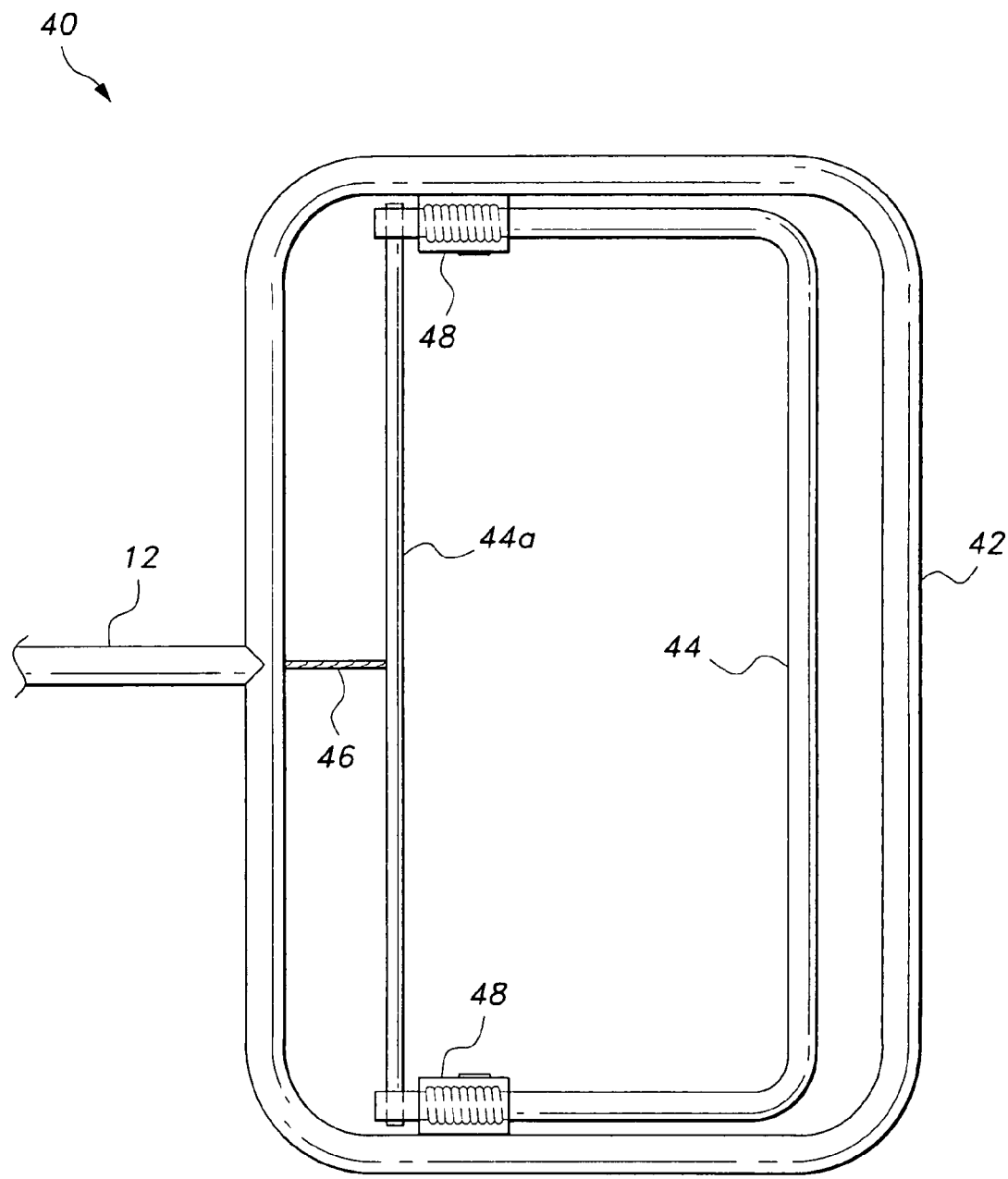
FIG. 4 is a top view of a handle and trigger mechanism of a wheeled carrier according to the present invention.

As best seen in FIG. 4, handle 40 is fabricated from tubes 42 and incorporates a trigger mechanism 44, 44a for controlling the supply of solution from the nozzle. Covers 48 enclose springs that bias the trigger to an off position. A trigger cable 46 extends from the trigger mechanism to a switch (not shown) for controlling the valve to the nozzle.

Figure 5:
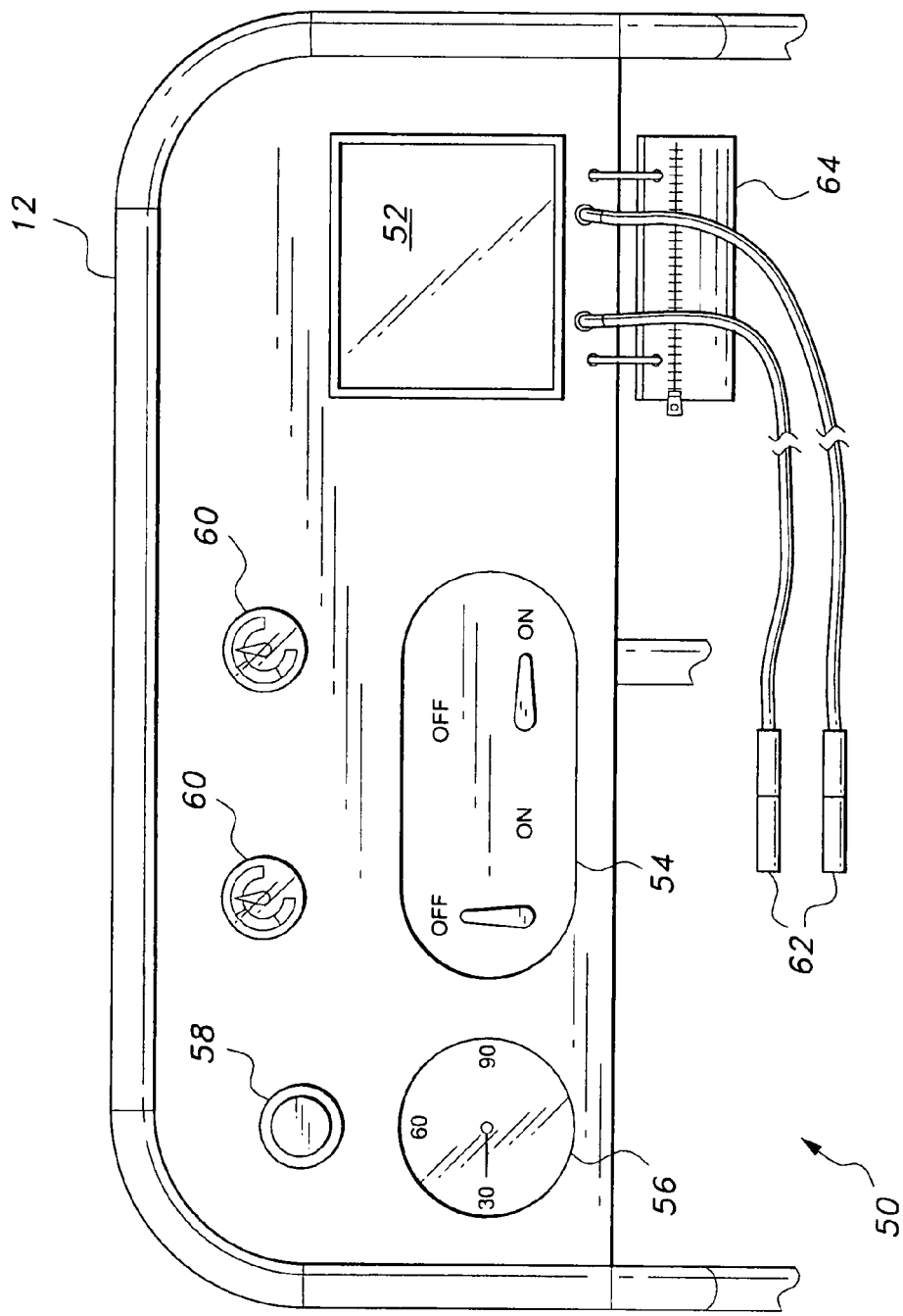
FIG. 5 is a front view of a control panel of a wheeled carrier according to the present invention.

FIG. 5 best illustrates the features of the control panel. Control panel 50 includes a computer 52 mounted thereon for integrating all functions of the carrier. Panel 50 includes on/off switches 54 for both tanks, an air pressure monitor 56, a push-button switch 58 for the air compressor and gauges 60 to monitor battery power. PH level tester probes 62 are interfaced with the computer. A closable pouch 64 is employed to house probes 62 when the probes are not in use.

Figure 6:
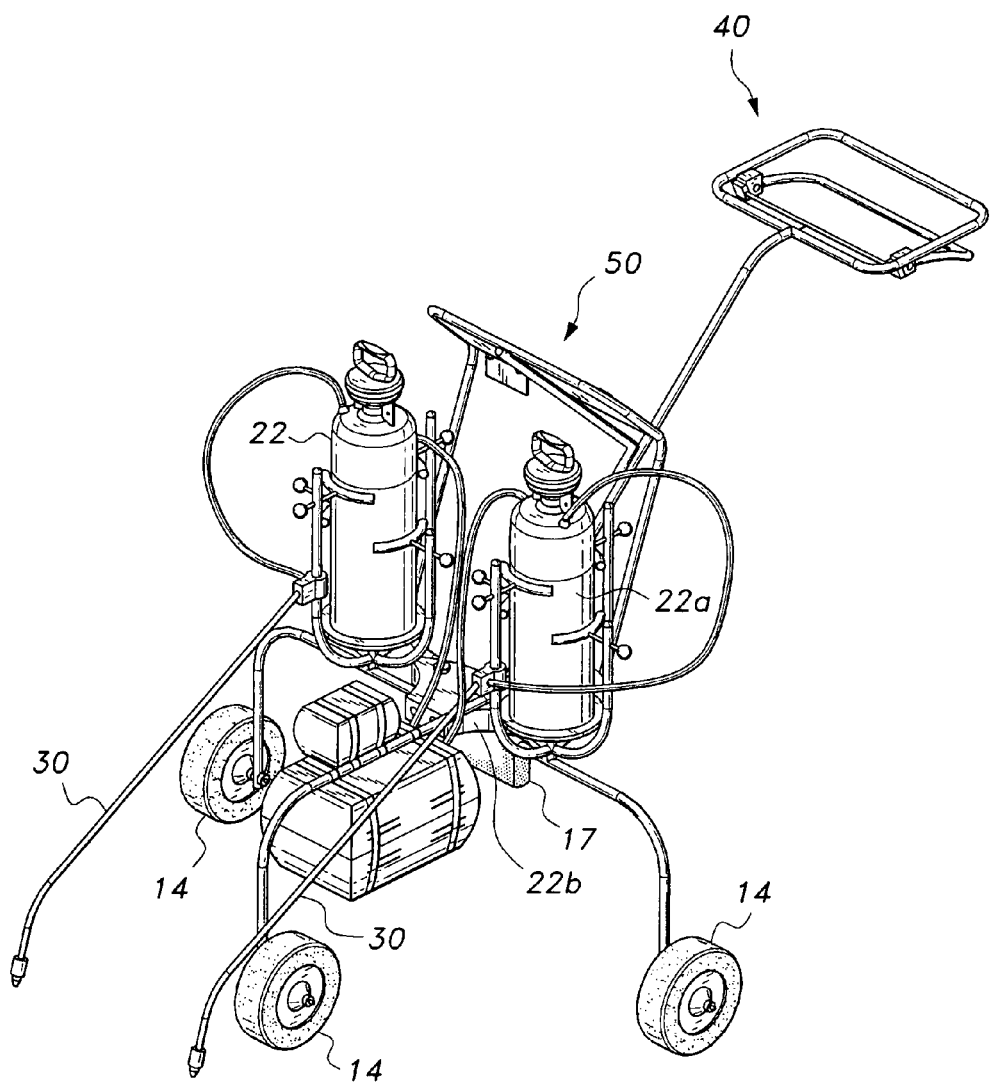
FIG. 6 is a perspective view of a second embodiment of a lo wheeled carrier according to the present invention.

FIG. 6 is illustrative of a second embodiment of the invention wherein the basket is expanded to support two extra tanks. This arrangement increases the amount of solution, and increases the size of the area that can be treated without refilling the tanks. The first extra tank 22a is identical to tank 22. Third tank 22b is supported on the basket between tanks 22 and 22a.

Figure 7:
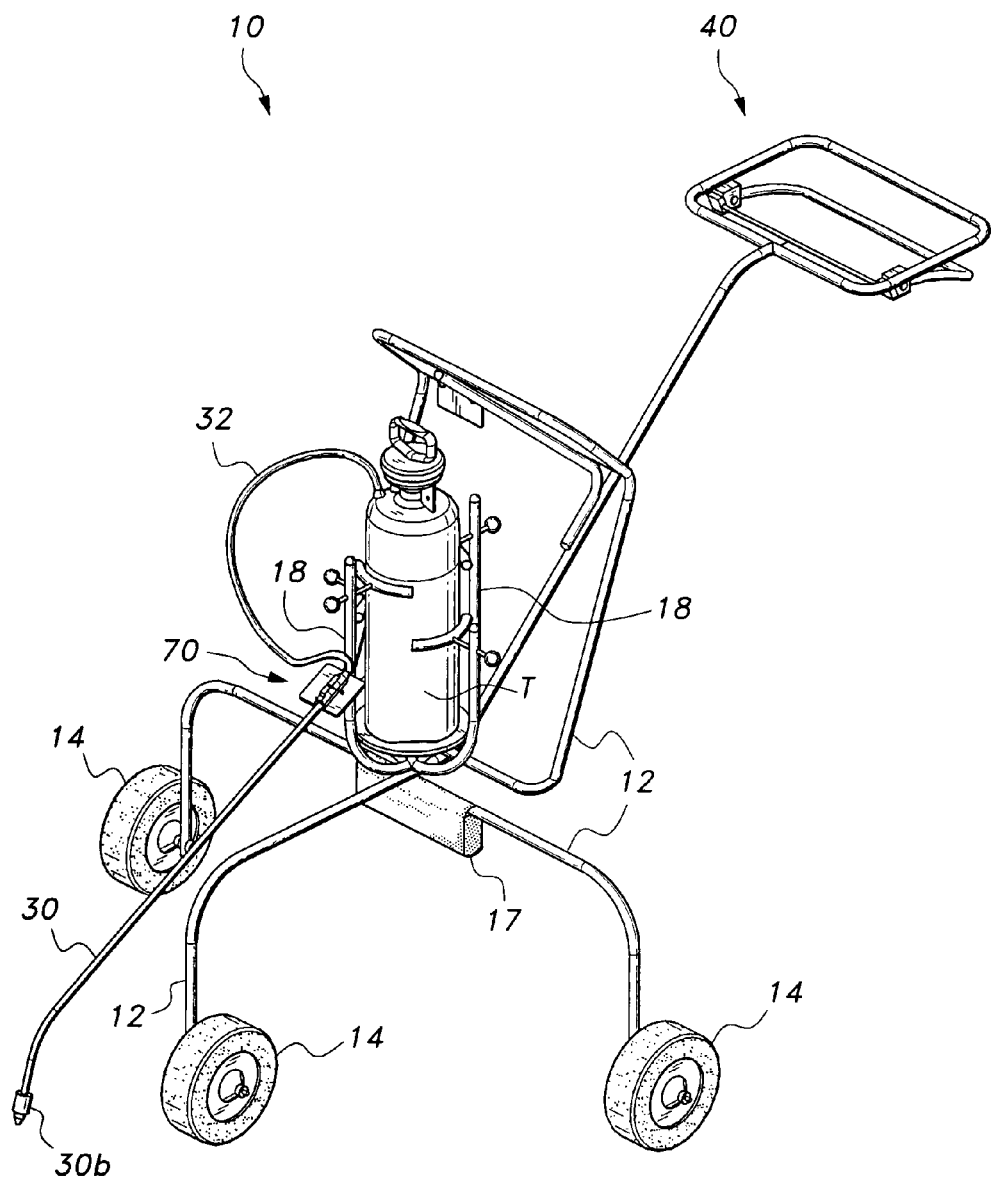
FIG. 7 is a perspective view of a third embodiment of a wheeled carrier according to the present invention.

FIG. 7 illustrates a basic embodiment of the invention designed to utilize a single, conventional, hand-pumped tank T. The instant embodiment does not incorporate an air compressor, battery or control panel. A spray nozzle support apparatus 70 (described below) is removably attached to a tube 18 of the basket.

Figure 8:
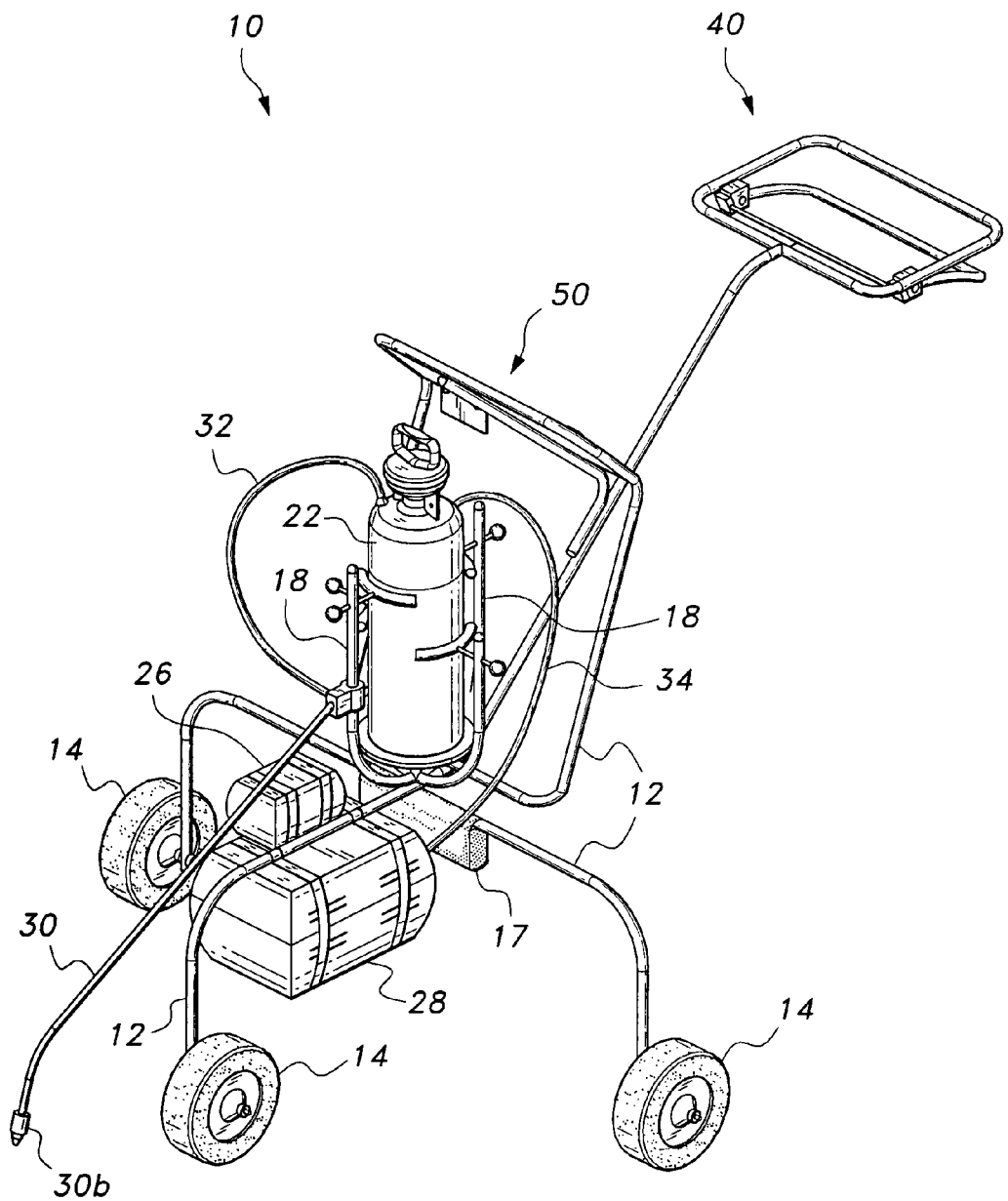
FIG. 8 is a perspective view of a fourth embodiment of a wheeled carrier according to the present invention.

The embodiment shown in FIG. 8 is a "step up" from the embodiment of FIG. 7 and incorporates a battery 26, air compressor 28 and control panel 50.

Figure 9:
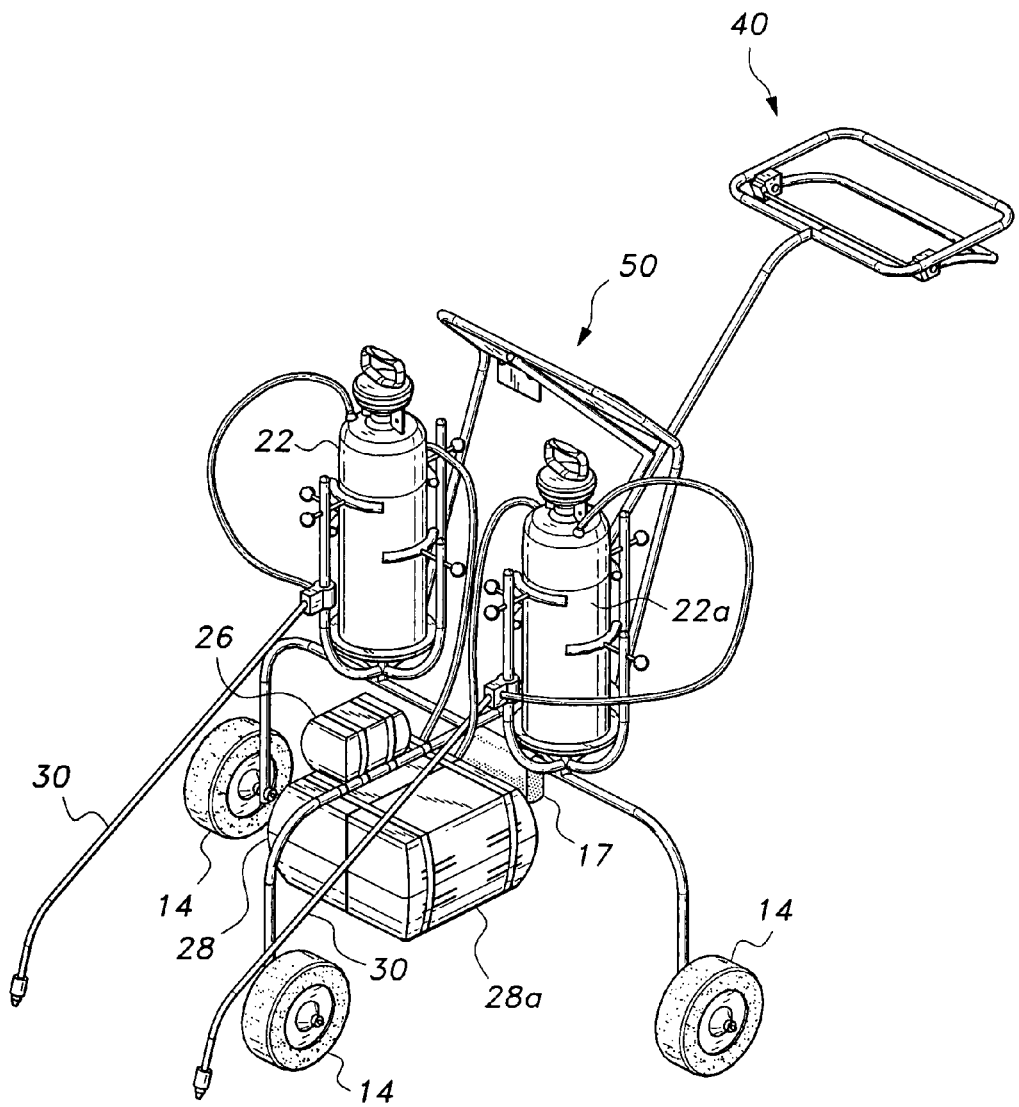
FIG. 9 is a perspective view of a fifth embodiment of a wheeled carrier according to the present invention.

The embodiment of FIG. 9 is an upgrade of the embodiment of FIG. 8 in that two tanks 22, 22a are employed. The instant embodiment also employs two air compressors 28, 28a, one for each tank.

Figure 10:
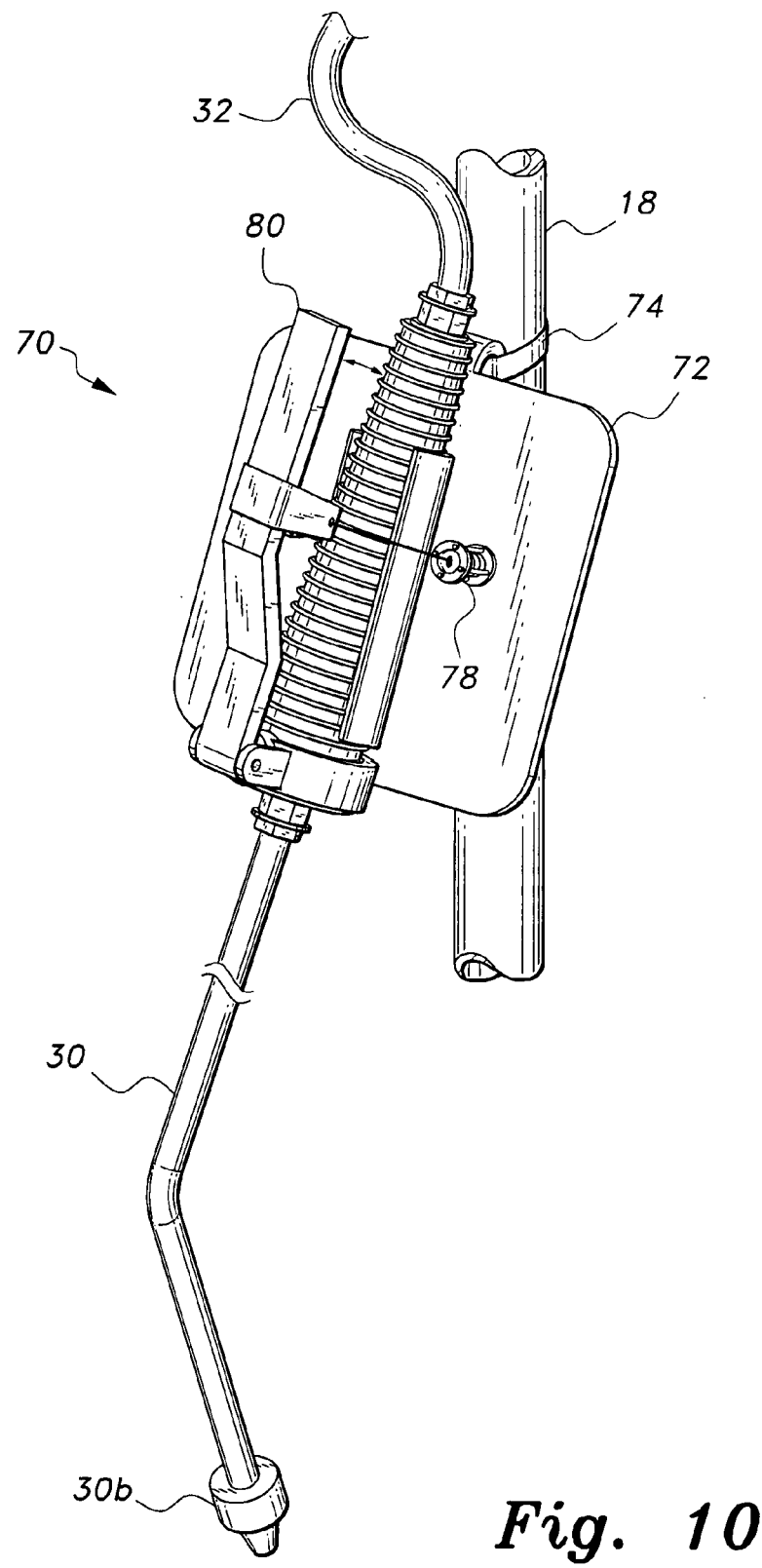
FIG. 10 is a partial, perspective view of a spray nozzle holder for use with the embodiment of FIG. 7.
Figure 11A:
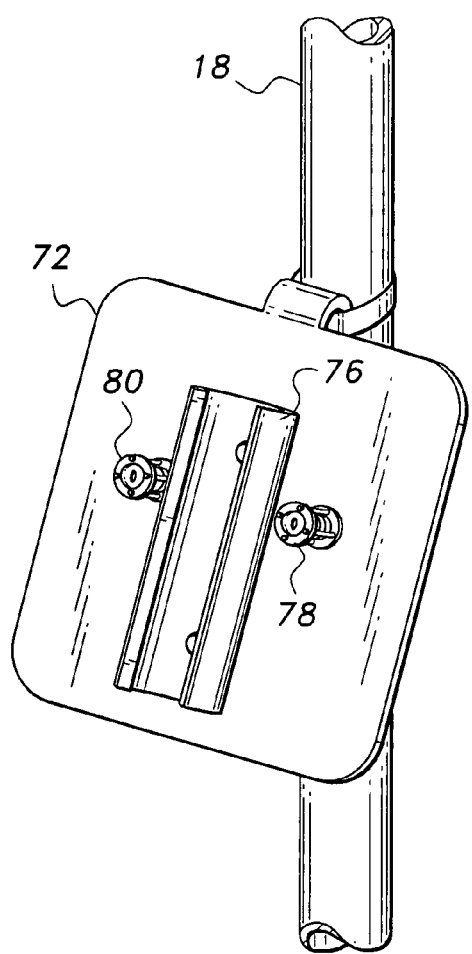
FIGS. 11A-11D are views of the mounting arrangement of the spray nozzle holder for a wheeled carrier according to the present invention.
Figure 11B:
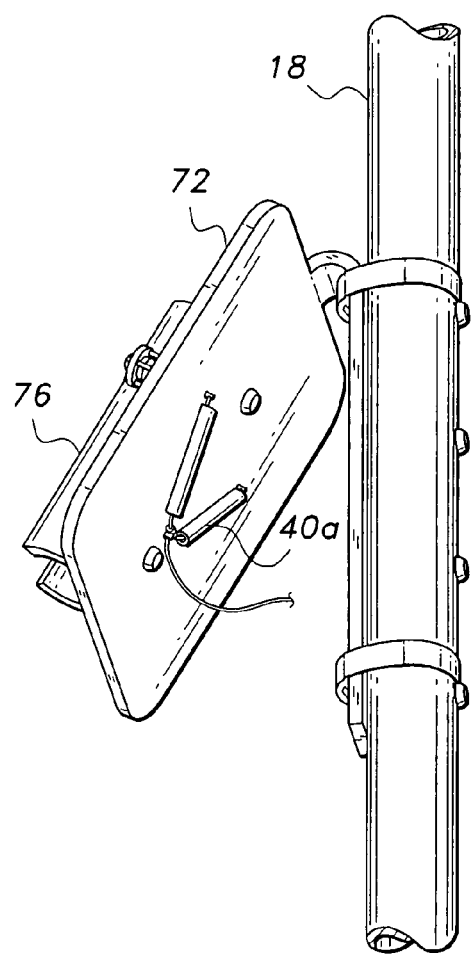
Figure 11C:
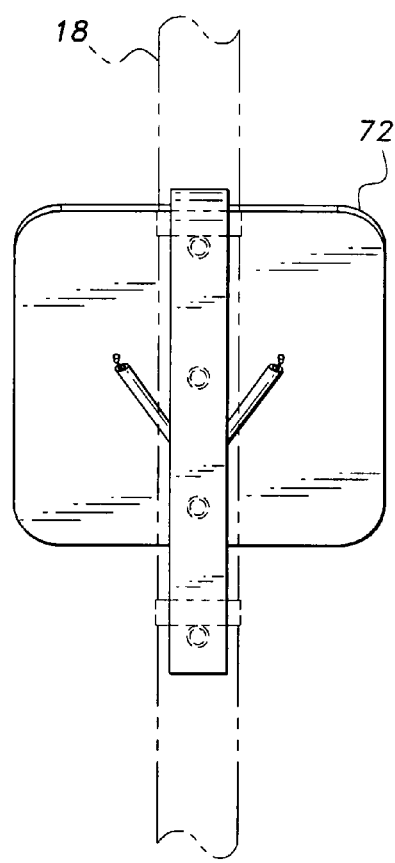
Figure 11D:
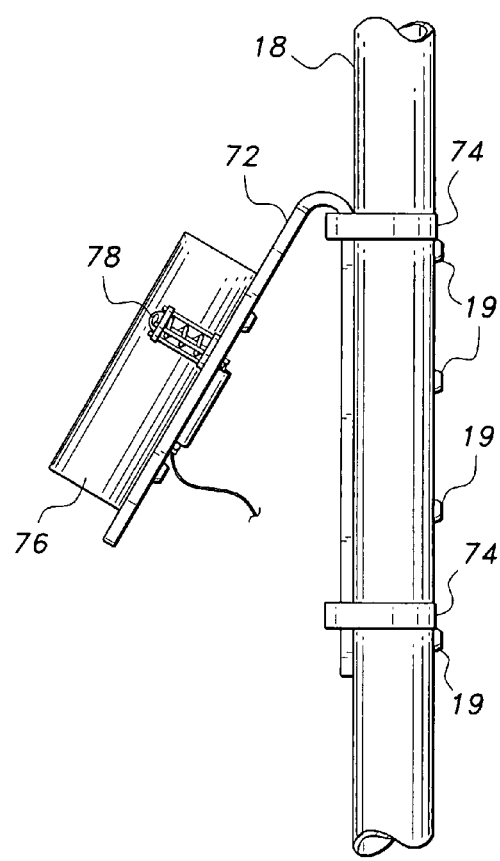

FIGS. 10-11D best illustrate spray nozzle support apparatus 70. Apparatus 70 includes a plate 72 removably secured to tube 18 by straps 74. Strap stops 19 are disposed on tube 18 to stabilize straps 74 thereon. A spray nozzle holder 76 is attached to the front face of plate. Spring 78 and lever 80 assemblies function to secure the spray nozzle in holder 76. Lines 40a are connected to the trigger 40 to control spray flow.

Figure 12:
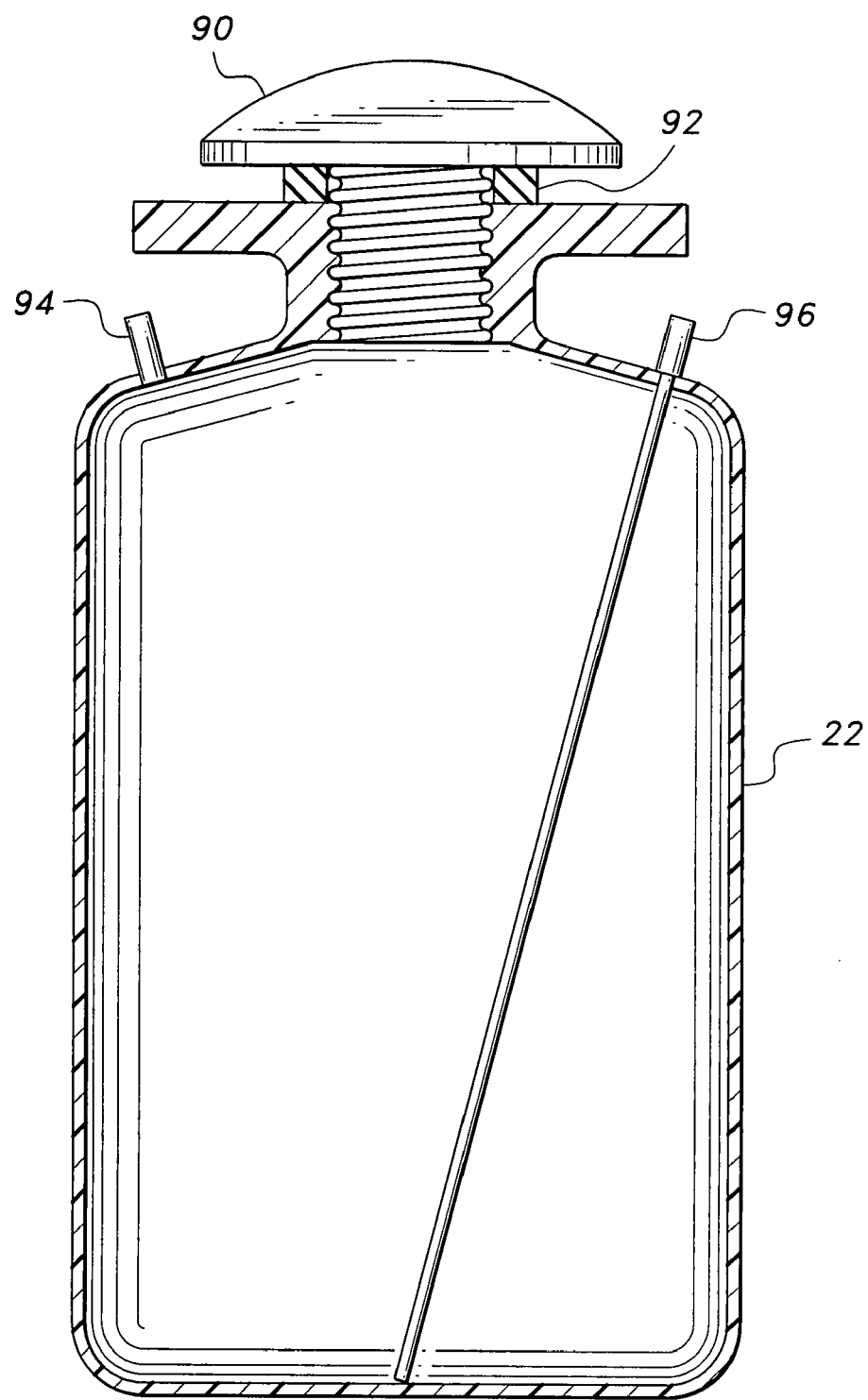
FIG. 12 is a sectional view of a fuel tank for a wheeled carrier according to the present invention.

FIG. 12 is illustrative of a tank to be employed in the invention. Tank 22 is designed to contain approximately three and one half gallons of solution i.e. pesticide or herbicide. Tank 22 includes a removable cap 90, which cap seals the opening in the top of the tank. A washer 92 is employed to facilitate the seal. An inlet 94 is disposed on the upper end of the tank to receive a line from the air compressor. An outlet 96 is employed to supply the solution to the spray nozzle.

Figure 13:
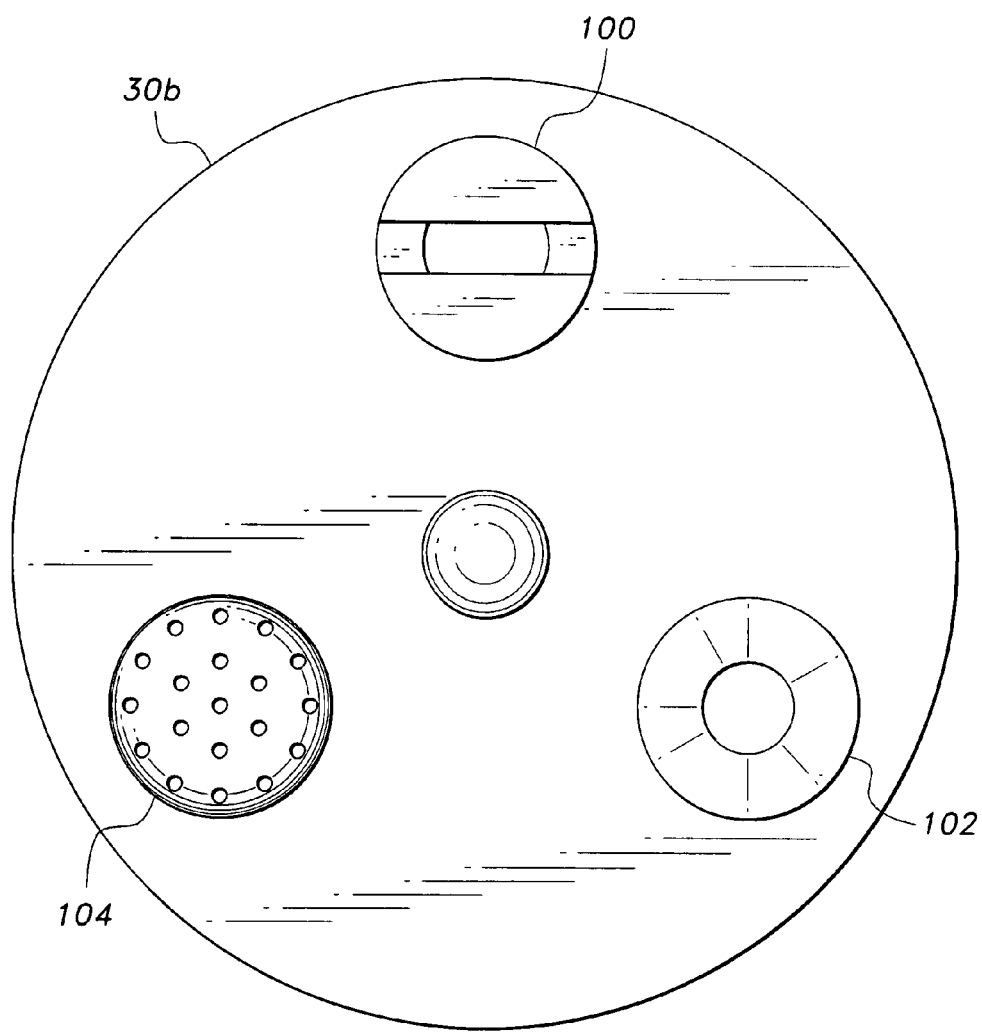
FIG. 13 is an end view of a nozzle for a wheeled carrier according to the present invention.

FIG. 13 shows a spray nozzle tip 30b utilized to dispense the solution. Nozzle 30b can be adjusted to dispense the solution in either a flat spray from outlet 100, a jet spray from outlet 102 or a mist spray from outlet 104.

It is to be understood that the present invention is not limited to the embodiments described above, but encompasses any and all embodiments within the scope of the following claims.

We claim:

1. A wheeled cart adapted to support a fluid containing tank for spraying a fluid therefrom, comprising:

a frame member having three legs, wherein a first leg defines a center member having a first end and a second end, wherein the center member comprises a continuous tubular frame defining a first substantially horizontal section, a second section angled downwardly from the horizontal section and terminating at the first end, and a third section angled in an obtuse direction from the horizontal section and terminating at the second end, wherein the third section has a greater length than the second section, a second leg and a third leg being located transversely to and symmetrically about the center member and having terminal ends, said frame member and legs being fabricated from tubular stock;

respective wheels mounted on the first end of the center member and on each of said terminal ends;

at least one basket mounted on said frame member, said at least one basket including a horizontal base plate and a plurality of spaced apart vertical support members arrayed about said base plate, each of said vertical support members including an adjustable clamp member adapted to support a fluid containing tank mounted on said at least one basket;

a spray nozzle adapted to be connected to a said at least one fluid containing tank for spraying fluid from said tank;

a handle connected to said second end of said center member; and a trigger connected to said handle for controlling spray from said nozzle.

2. The wheeled cart for spraying fluid therefrom according to claim 1, wherein said respective wheels include two rear wheels and one front wheel and wherein said rear wheels are larger than said front wheel.

3. The wheeled cart for spraying fluid therefrom according to claim 1, including a plate member removably attached to said basket for supporting said spray nozzle.

4. The wheeled cart for spraying fluid therefrom according to claim 1, wherein there are two baskets mounted on said frame member and wherein there is a respective fluid containing tank mounted on each basket.

5. The wheeled cart for spraying fluid therefrom according to claim 4, including a third fluid containing tank mounted on said frame member between said two baskets.

6. The wheeled cart for spraying fluid therefrom according to claim 1, including an air compressor and battery supported on said frame member.

7. The wheeled cart for spraying fluid therefrom according to claim 1, including an air compressor and battery supported on said frame member and further including a control panel, said control panel having controls for operating said air compressor and battery.

8. The wheeled cart for spraying a fluid therefrom according to claim 1, further comprising two baskets mounted on said frame member, said two basket being fabricated from tubular stock; respective spray nozzles adapted to be connected to each of the plural fluid containing tanks for spraying fluid from each of the plural fluid containing tanks; and a trigger connected to each respective spray nozzle for controlling spray therefrom.

9. The wheeled cart for spraying fluid therefrom according to claim 1, wherein at least one fluid containing tank is mounted on said at least one basket.

10. The wheeled cart for spraying fluid therefrom according to claim 9, further including a second tank mounted in said at least one basket, said second tank being configured as a hollow doughnut and encompassing said at least one fluid containing tank.

11. The wheeled cart for spraying fluid therefrom according to claim 1, wherein said plurality of spaced apart vertical support members are fabricated from tubular stock.

12. A wheeled cart for spraying a fluid therefrom comprising:

a frame member having three legs, wherein a first leg defines a center member having a first end and a second end, wherein the center member comprises a continuous tubular frame defining a first substantially horizontal section, a second section angled downwardly from the horizontal section and terminating at the first end, and a third section angled in an obtuse direction from the horizontal section and terminating at the second end, wherein the third section has a greater length than the second section, a second leg and a third leg being located transversely to and symmetrically about the center member and having terminal ends, said frame member and legs being fabricated from tubular stock;

respective wheels mounted on each of said three legs;

two baskets mounted on said frame member, said two basket being fabricated from tubular stock;

plural fluid containing tanks mounted on each of said two baskets, wherein one of each respective plural fluid tanks is configured as a hollow doughnut and the other of the fluid containing tanks is encompassed within the hollow doughnut tank;

adjustable clamp members for supporting said plural fluid containing tanks mounted on each of said two baskets;

a pouch containing spray nozzles mounted on said frame member;

respective spray nozzles connectable to each of said plural fluid containing tanks for spraying fluid from each of said plural fluid containing tanks; and a trigger connected to each respective spray nozzle for controlling spray therefrom.

13. The wheeled cart for spraying fluid therefrom according to claim 12, wherein said respective wheels include two rear wheels and one front wheel and wherein said rear wheels are larger than said front wheel.

14. The wheeled cart for spraying fluid therefrom according to claim 12, including an air compressor and battery supported on said frame member and further including a control panel supported on said frame member, said control panel having controls for operating said air compressor and battery.

15. A wheeled cart for spraying a fluid therefrom, comprising:

a frame member having three legs, wherein a first leg defines a center member having a first end and a second end, wherein the center member comprises a continuous tubular frame defining a first substantially horizontal section, a second section angled downwardly from the horizontal section and terminating at the first end, and a third section angled in an obtuse direction from the horizontal section and terminating at the second end, wherein the third section has a greater length than the second section, a second leg and a third leg being located transversely to and symmetrically about the center member and having terminal ends, said frame member and legs being fabricated from tubular stock;

respective wheels mounted on each of said three legs;

at least one basket mounted on said frame member, said one basket being fabricated from tubular stock;

a first fluid containing tank mounted on said at least one basket and being configured as a hollow doughnut, a second fluid containing tank fluid mounted on said at least one basket and being encompassed within said hollow doughnut tank;

a spray nozzle connected to at least said first fluid containing tank for spraying fluid from said tank; and a trigger connected to said nozzle for controlling spray from said nozzle.

* * * * *